(12) United States Patent
Numai

(10) Patent No.: US 6,631,002 B1
(45) Date of Patent: Oct. 7, 2003

(54) CONTROL OF LASER BEAMS IN A RING LASER GYRO

(75) Inventor: Takahiro Numai, Ninomiya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 09/705,803

(22) Filed: Nov. 6, 2000

(30) Foreign Application Priority Data

Nov. 11, 1999 (JP) ............................................. 11-321499
Nov. 11, 1999 (JP) ............................................. 11-321500

(51) Int. Cl.$^7$ ............................................. G01C 19/64
(52) U.S. Cl. ........................................................ 356/461
(58) Field of Search ................................. 356/459, 461, 356/472; 372/94, 38.07

(56) References Cited

U.S. PATENT DOCUMENTS

| | | | | |
|---|---|---|---|---|
| 4,405,236 A | * | 9/1983 | Mitsuhashi et al. | ......... 356/459 |
| 4,431,308 A | | 2/1984 | Mitsuhashi et al. | |
| 4,661,964 A | * | 4/1987 | Haavisto | ..................... 356/459 |
| 4,913,548 A | | 4/1990 | Vick | |
| 4,986,661 A | * | 1/1991 | Vick | ........................... 356/461 |
| 5,331,403 A | * | 7/1994 | Rosker et al. | .............. 356/459 |
| 5,331,660 A | | 7/1994 | Hauck | |
| 5,764,681 A | | 6/1998 | Ballantyne et al. | |

FOREIGN PATENT DOCUMENTS

| | | |
|---|---|---|
| JP | 57-43486 | 3/1982 |
| JP | 4-174317 | 6/1992 |
| JP | 5-288556 | 11/1993 |

OTHER PUBLICATIONS

J.J. Liang, et al., "Unidirectional Operation of Waveguide Diode Ring Lasers", Appl. Phys. Lett., vol. 70, No. 10, pp. 1192–1194 (1997).

* cited by examiner

Primary Examiner—Samuel A. Turner
(74) Attorney, Agent, or Firm—Fitzpatrick, Cella, Harper & Scinto

(57) ABSTRACT

A ring laser gyro wherein a first and a second laser beam propagate with propagating directions different with each other comprises electrode areas on an optical waveguide configuring the ring laser and controls an current injected or a voltage applied to the electrode areas, wherein the oscillating frequencies of the first and second laser beams are different from each other, thereby causing an increase and a decrease in the beat frequency enabling to detect the direction and the speed of a rotation at the same time. With regards to a method for detecting a rotation, the anode of the laser gyro is connected to an operational amplifier. Since the signal outputted from the operational amplifier has a frequency corresponding to the angular speed, it is converted into the voltage by a frequency-voltage conversion circuit so as to detect a rotation. This same method can be used for other types of gyros such as a semiconductor laser gyro, a gas lager gyro and the like.

8 Claims, 13 Drawing Sheets

DRY ETCHING

28

11

CONTROL OF LASER BEAMS IN A RING LASER GYRO

BACKGROUND OF THE INVENTION

1. Field of the Invention

The present invention relates to a laser gyro, a semiconductor laser gyro, a method for driving the laser gyro and the method for driving the semiconductor laser gyro and, in particular, to a laser gyro of ring resonator type.

2. Related Background Art

Heretofore in the past, there have been known mechanical gyros having rotors and transducers or optical gyros as gyros for detecting the angular speed of a moving object. Since the optical gyros in particular are capable of starting up instantaneously and have a wide dynamic range, they are bringing about a revolution in the field of gyro technology.

The optical gyros include laser gyros, optical fiber gyros, passive resonator gyros and the like. Among them, a laser gyro employing a gas laser was most early undertaken to develop and already put to practical use in the art of aircrafts and the like.

Recently, as a small and highly accurate laser gyro, a semiconductor laser gyro integrated on a semiconductor substrate is proposed, which is disclosed, for example, in Japanese Patent Application Laid-Open No. 5-288556. This specification discloses a technique for taking out laser beams propagating in a clockwise direction and a counterclockwise direction respectively from laser elements of ring ridge type and for causing them to interfere with each other and taking out an interference intensity as photocurrent.

Also, in Japanese Patent Application Laid-Open No. 57-43486 (U.S. Pat. No. 4,431,308), a gyro is disclosed, which utilizes a change in the terminal voltage of the above described element with rotation without taking out light from the semiconductor laser element.

In FIG. 29, a semiconductor laser element 5792 has electrodes 5790, 5791 above and below it. Reference numeral 5793 denotes a direct current blocking capacitor, reference numeral 5794 an output terminal, and reference numeral 5795 a resistor. It is disclosed that, as shown in FIG. 29, the semiconductor laser element as a laser element for the ring laser device is connected to a driving power source 5796, and a frequency difference (a beat frequency) between light beams clockwise and counterclockwise generated when a certain angular speed is given to the above device is detected as a difference between the terminal voltages of the laser element.

Also, it is further disclosed in Japanese Patent Application Laid-Open No. 4-174317 that a change in the terminal voltage of the laser element which is generated with rotation is detected.

However, the conventional laser gyro cannot detect a rotation direction. This is because the beat frequencies detected from the terminal voltage has the same value whether the rotating direction of the semiconductor laser element is clockwise or counterclockwise. For this reason, dithering was effected and, from the correlation between the direction and signal of the dither, the rotating direction was determined.

Also, in the laser gyro, with a rotation, oscillating frequencies are divided into two. However, when the rotation speed is small, a difference between the oscillating frequencies becomes small. In this case, because of non-linearity in the medium, a rock-in phenomenon occurred, wherein the oscillating frequencies were drawn into another mode. In order to release this rock-in phenomenon, the dithering of the laser gyro is conducted.

SUMMARY OF THE INVENTION

It is an object of the present invention to provide a laser gyro, a semiconductor laser gyro, a method for driving the laser gyro and a method for driving the semiconductor laser gyro, in which the direction of a rotation can be detected even when a mechanical device such as a dither is not disposed, and hard to cause a rock-in phenomenon.

The ring laser gyro according to the present invention is a ring laser gyro in which first and second laser beams propagate in opposite directions from each other, characterized in that plural electrode areas are provided on an optical waveguide comprised in the ring laser, and current injected or voltage applied to the electrode areas is controlled, so that the oscillating frequencies of the first and second laser beams become different from each other at a time when the ring laser gyro is in a stationary state.

The above control is such that current is injected to the plural electrodes so that a space in which the refractive index of the optical waveguide is modulated moves in the same direction as the propagating direction of the first or second laser beam as time goes on.

Also, the above control is such that injected current is propagated in the same direction as the propagating direction of the first or second laser beam.

A method for driving the ring laser gyro according to the present invention is characterized in that a space in which the refractive index of an optical waveguide is modulated moves in one propagating direction as time goes on.

Also, the method for driving the ring laser gyro according to the present invention is a method for driving ring laser gyro having plural electrodes, characterized in that voltage applied or current injected to the plural electrodes is modulated with a time difference set among the electrodes so that a sequence of modulations is in a propagating direction.

Also, the method for driving the ring laser gyro according to the present invention is a method for driving the semiconductor laser gyro in which by flowing the current to generate laser oscillation light is propagated in one propagating direction or in the propagating direction opposite to the one propagating direction, characterized in that the flowing direction of the current is limited to the one propagating direction.

DETAILED DESCRIPTION OF THE PREFERRED EMBODIMENTS

Hereinafter, the present invention will be described with reference to the accompanying drawings. While here the description will be made by citing an example of the semiconductor laser gyro as a laser gyro, it is not limited to this alone, but the present invention can be applied, for example, to a gas laser gyro as well.

[First Embodiment]

Figure 9A:
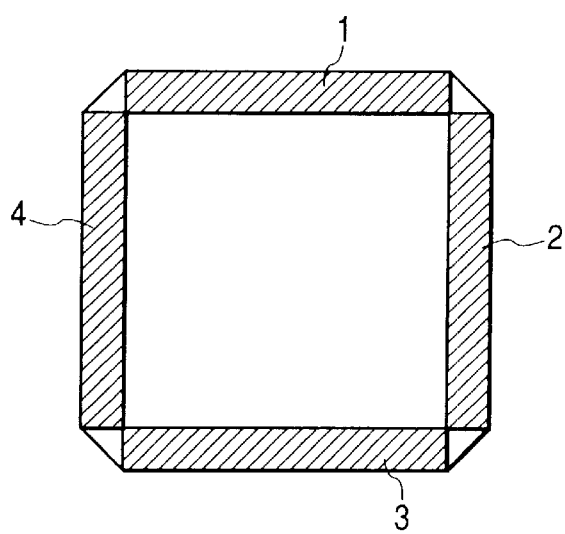
FIGS. 9A and 9B are a top view showing the structure of the semiconductor laser gyro according to the present invention and a drawing explaining a timing chart for the current injected to each electrode.
Figure 9B:
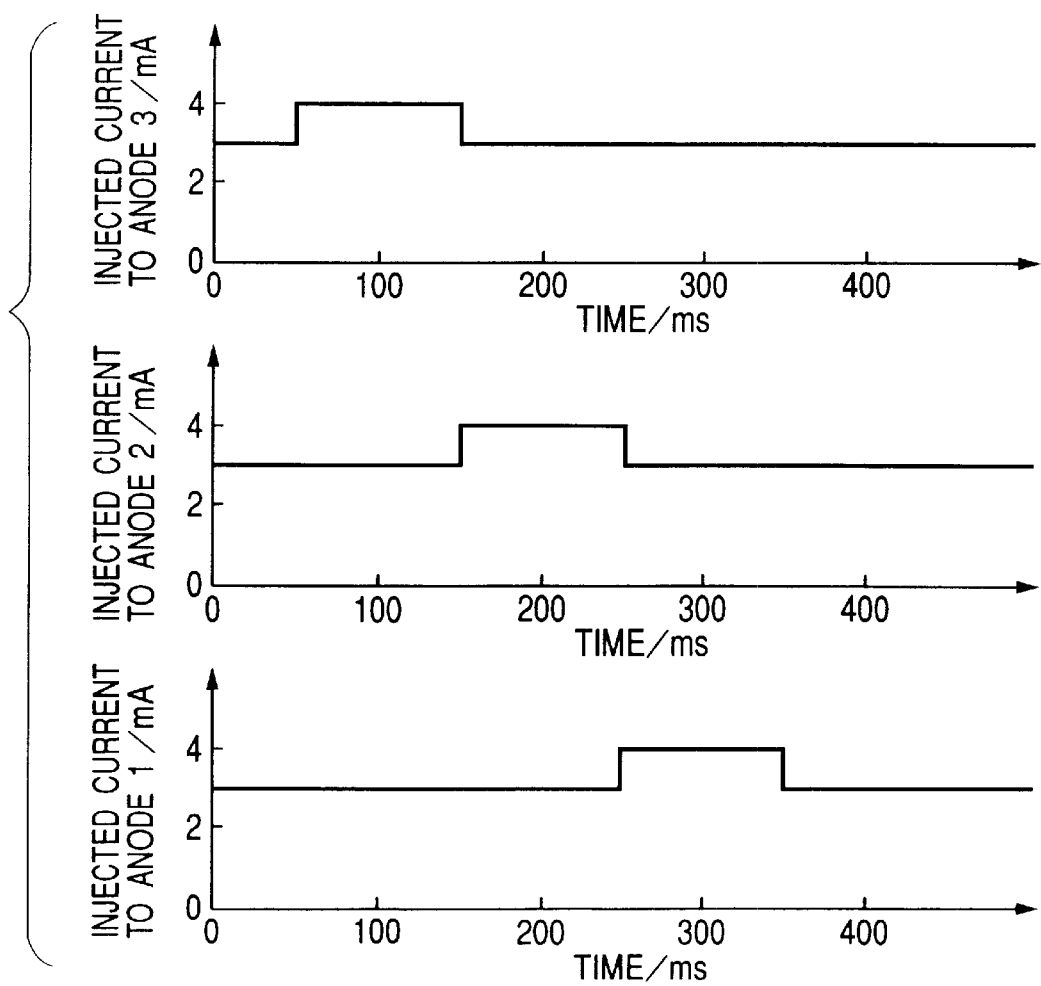

FIG. 9A shows a top view of the semiconductor laser gyro and FIG. 9B shows a timing chart for the current injected to each electrode. In the same drawing, reference numerals 1, 2, 3 and 4 denote anodes and each anode is electrically separated. In this state, as shown in FIG. 9B, the current is injected to anodes 1, 2 and 3 with a time difference set up across them. Note that the shape of the anodes 1 to 4 is not limited to the shape as shown in the drawing, but may be the shape in which the current can be injected similarly to a timing chart as shown in FIG. 9B. In the semiconductor, when an effect of heat generation can be disregarded, a refractive index is reduced by free carrier plasma effect accompanied with the injection of the current. On the other hand, when the heat generation by joule heat accompanied with the injection of the current is dominant, the refractive index is increased. In either case, when the current is large, the refractive index changes in contrast to the case where the current is small. Now, let an equivalent refractive index of the optical waveguide represent $n_o$ when the injected current is 3 mA and $n_p$ when the injected current is 4 mA.

In FIG. 9B, the electrode in which the injected current becomes 4 mA shifts to an electrode 3, an electrode 2 and an electrode 1 as time goes by. This means that the area having the refractive index $n_p$ is propagating counterclockwise as time goes by. If the length of one side of the electrode is represented by l and the width of the current pulse by $t_p$, the propagating speed v is given by the following Equation (1):

$$v = \frac{l}{t_p} \quad (1)$$

Now, assume that the area having an equivalent refractive index such as above is moving counterclockwise. At this time, if the speed of light $V_L$ in the area having the equivalent refractive index $n_p$ is observed from a system fixed to the ring resonator, the following Equation (2) is given from the special theory of relativity:

$$v_L = \frac{c}{n_0} \pm \left(1 - \frac{1}{n_p^2}\right)v \quad (2)$$

Here, c denotes the speed of light in a vacuum. As a result, the following difference $\Delta f_n$ is generated between the resonance frequency $f_1$ of the light counterclockwise and the resonance frequency $f_2$ of the light clockwise:

$$\Delta f_n = f_2 - f_1 = \frac{2(n_p^2 - 1)vml}{\lambda_0 n_0 L} = \frac{2(n_p^2 - 1)ml^2}{\lambda_0 n_0 t_p L} \quad (3)$$

Here, m represents the number of electrodes for modulating the current. In FIG. 9B, m=3 because the electrodes 1, 2 and 3 are employed. Of course, m=2 or m=4 may be acceptable. For example, when m=2, a direct current is flowed to the two remaining electrodes where no current is modulated. Also, L denotes a whole length of the resonator, $\lambda_o$ an oscillating wave length in a vacuum when the equivalent refractive index of an optical resonator is $n_o$. Note that a constant current (for example, 4 mA) is flowed to the electrode 4. Of course, the current may not be flowed.

As a result, a beat light having the beat frequency $\Delta f_n$ is generated inside a semiconductor laser and a total light intensity inside the semiconductor laser fluctuates at a beat frequency $\Delta f$. In response to this, a carrier concentration in an active layer fluctuates at the beat frequency and, when a constant current is flowed into the semiconductor laser, a terminal voltage changes at the beat frequency. Thus, even when this element is in a stationary state, a beat signal is observed from the electrical terminal of the element.

Next, the case where this element rotates counterclockwise at an angular speed $\Omega$ is considered. At this time, due to Sagnac effect, the frequency $f_{1R}$ of a light counterclockwise and the frequency $f_{2R}$ of a light clockwise are given respectively by the following Equations (4) and (5):

$$f_{1R} = f_1 - \frac{2n_0 S}{\lambda_0 L}\Omega \quad (4)$$

$$f_{2R} = f_2 + \frac{2n_0 S}{\lambda_0 L}\Omega \quad (5)$$

Here, S denotes an area surrounded by the optical path of the resonator and L denotes a length of the optical path of the ring resonator. As a result, the following beat signal is obtained from the electrical terminal of the element. However, a secondary infinitesimal term was disregarded.

$$\Delta f_R = f_{2R} - f_{1R} = \frac{2(n_p^2 - 1)ml^2}{\lambda_0 n_0 t_p L} = \frac{4n_0 S}{\lambda_0 L}\Omega \quad (6)$$

From this result, it is apparent that, if the propagating direction of an electron and the propagating direction of the element are the same, the beat frequency becomes larger than when it is in a stationary state.

On the other hand, if the propagating direction of the electron and the propagating direction of the element is opposite to each other, the beat frequency becomes smaller than when it is in a stationary state as shown by the following Equation (7):

$$\Delta f_L = \frac{2(n_p^2 - 1)ml^2}{\lambda_0 n_0 t_p L} - \frac{4n_0 S}{\lambda_0 L}\Omega \quad (7)$$

In this manner, from increase and decrease in the beat frequency in a stationary state, the direction of a rotation can be detected.

Figure 10A:
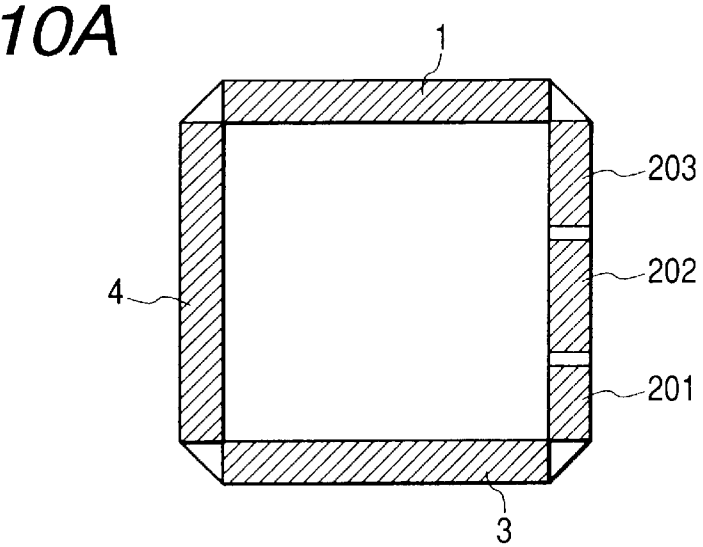
FIGS. 10A and 10B are a top view showing the structure of the semiconductor laser gyro according to the present invention and a drawing explaining a timing chart for the current inputted to each electrode.
Figure 10B:
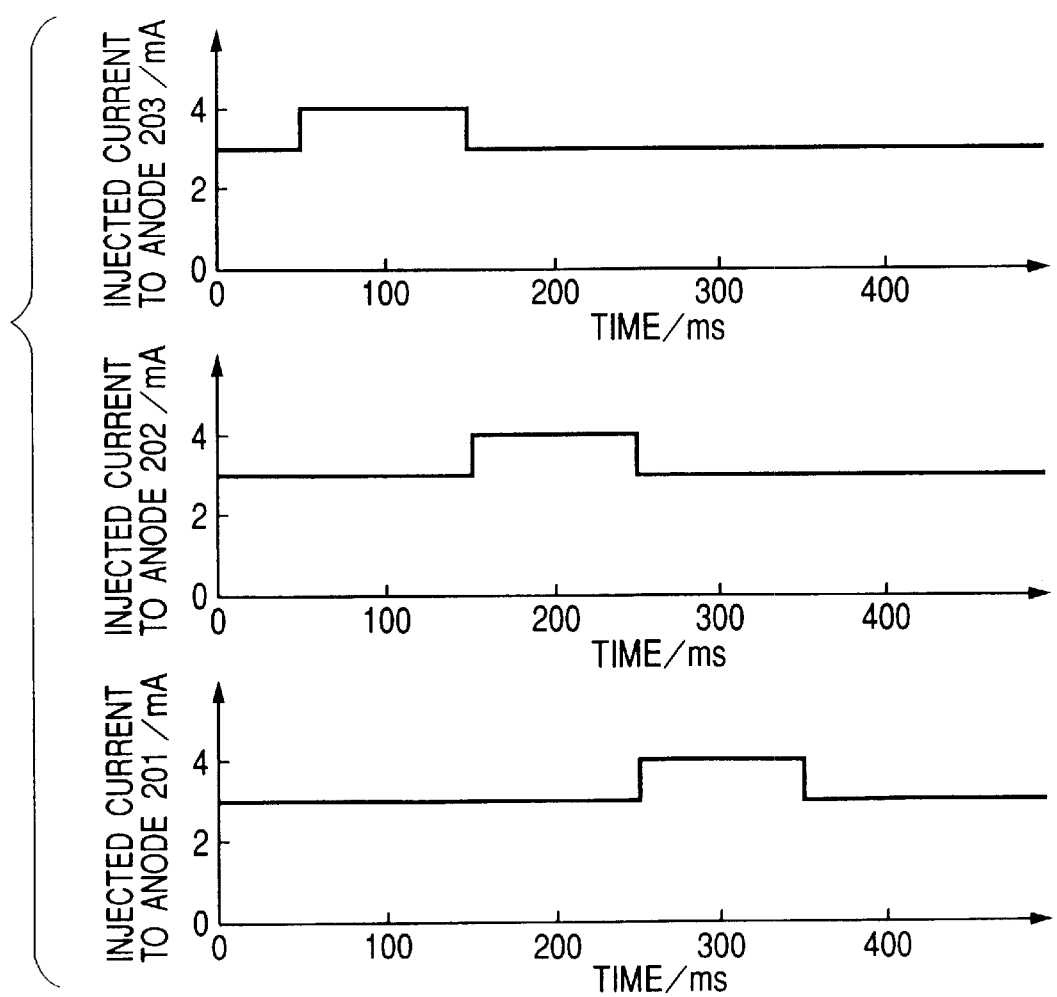

Note that what is meant by one propagating direction includes, of course, the case also where the electrode 2 of FIG. 9A is segmented like FIG. 10A and electrodes 201, 202 and 203 lined up in a straight line are sequentially modulated. Also, in this example, though the current is modulated, a voltage may be also modulated. Moreover, if a quantum well structure is employed for the optical waveguide, the refractive index can be controlled by a voltage through the utilization of a quantum confined stark effect.

[Second Embodiment]

Although the semiconductor laser gyro according to the present invention is characterized in that the injected current is flowed to one propagating direction, if the flowing direction of the current is one propagating direction, the propagating direction of the carrier is also one direction.

However, though the propagating directions of the electron and a positive hole are opposite to each other, since the speed of the electron is faster than that of the positive hole, the effect of the propagation of the carrier is controlled mainly by the electron.

Note that, in case of the semiconductor laser, while the carrier is confined by a double hetero structure in respect of the growth direction of a semiconductor layer, it can freely move about inside the surface of the semiconductor layer. The present invention utilizes the movement of this carrier (mainly the electron) inside the surface of the semiconductor layer and, for this reason, the current injected to the semiconductor laser may have a driving means for propagating in one direction at least in a part of area.

Figure 14A:
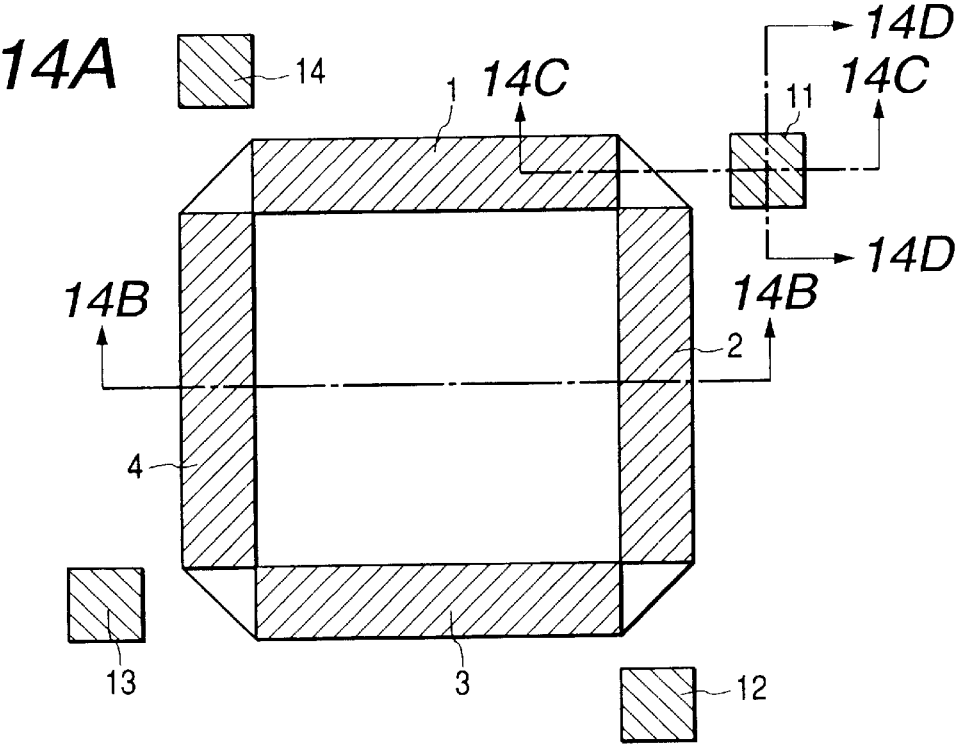
FIGS. 14A, 14B, 14C and 14D are a top view and sectional views showing the structure of the semiconductor laser gyro according to the present invention.

The case where the current flowing to the element is flowed to one propagating direction will be described with reference to the semiconductor laser having an electrode structure (reference numerals 1 to 4 denote anodes and 11 to 14 cathodes) as shown in FIG. 14A. The anode 1 and the cathode 11, the anode 2 and the cathode 12, the anode 3 and the cathode 13, and the anode 4 and the cathode 14 make a pair respectively and the current is flowed across each electrode.

Now, assume that, inside the surface of the semiconductor layer, the propagating direction of the electron is narrowed down to one direction. At this time, due to Doppler effect, the resonant frequency where a gain becomes the highest varies according to the light propagating clockwise and the light propagating counterclockwise. For example, assuming that the electron is propagating counterclockwise, the speed v thereof is represented by v>0. At this time, the resonant frequency $f_1$ of the light counterclockwise and the resonant frequency $f_2$ of the light clockwise are given by the following Equations (8) and (9):

$$f_1 = f_0\left(1 - \frac{n}{c}v\right) \quad (8)$$

$$f_2 = f_0\left(1 + \frac{n}{c}v\right) \quad (9)$$

Here, $f_0$ denotes the resonant frequency of the light when there is no Doppler effect available, c denotes the light speed in a vacuum and n denotes the refractive index of the semiconductor.

Moreover, if a back scattering can be disregarded, the coupling between two counterpropagating oscillating modes, i.e. the coupling between two oscillating modes propagating in opposite directions from each other becomes a weak coupling. As a result, these two modes will oscillate independently from each other. That is, inside the ring resonator, there coexist two counterpropagating oscillating modes where the oscillating frequencies are shifted due to Doppler effect. At this time, a beat light corresponding to the difference ($\Delta f$):

$$\Delta f = f_2 - f_1 = 2f_0 \frac{n}{c} v \quad (10)$$

between the two frequencies is generated inside the semiconductor laser, and a total light intensity inside the semiconductor laser fluctuate at the beat frequency Δf. In response to this, the carrier concentration in an active layer fluctuates at the beat frequency and, if a constant current is flowed to the semiconductor laser, the terminal voltage fluctuates at the beat frequency. Thus, a beat signal is observed from the electrical terminal of the element even when this element is in a stationary state.

Next, the case where this element rotates counterclockwise at an angular speed Ω is considered. At this time, due to Sagnac effect, the frequency $f_{1R}$ of the light counterclockwise and the frequency $f_{2R}$ of the light clockwise are given by the following Equations (11) and (12):

$$f_{1R} = f_0\left(1 - \frac{n}{c}v\right)\left(1 - \frac{n}{c}\frac{2S}{L}\Omega\right) \quad (11)$$

$$f_{2R} = f_0\left(1 + \frac{n}{c}v\right)\left(1 + \frac{n}{c}\frac{2S}{L}\Omega\right) \quad (12)$$

Here, S denotes an area surrounded by the optical path of the ring resonator and L denotes a length of the optical path of the ring resonator. As a result, from the electrical terminal of the element, the following beat signal is obtained. However, a secondary infinitesimal term was disregarded.

$$\Delta f_R = f_{2R} - f_{1R} = 2f_0\frac{n}{c}\left(v + \frac{2S}{L}\Omega\right) \quad (13)$$

From this result, it is apparent that, if the propagating direction of the electron and the rotating direction of the element is equal, the beat frequency becomes larger than when it is in a stationary state. On the other hand, if the propagating direction of the electron and the rotating direction of the element are opposite to each other, the beat frequency becomes smaller than when it is in a stationary state as shown by the following Equation (14):

$$\Delta f_L = 2f_0\frac{n}{c}\left(V - \frac{2S}{L}\Omega\right) \quad (14)$$

Thus, by increase and decrease in the beat frequency in a stationary state, the direction of a rotation can be detected.

Note that, in order to propagate the current flowing to the semiconductor laser effectively in one direction, the semiconductor laser is preferably in the shape of a ring.

[Embodiments]

The embodiments of the present invention will be described in detail with reference to the accompanying drawings.

[Embodiment 1]

Figure 1A:
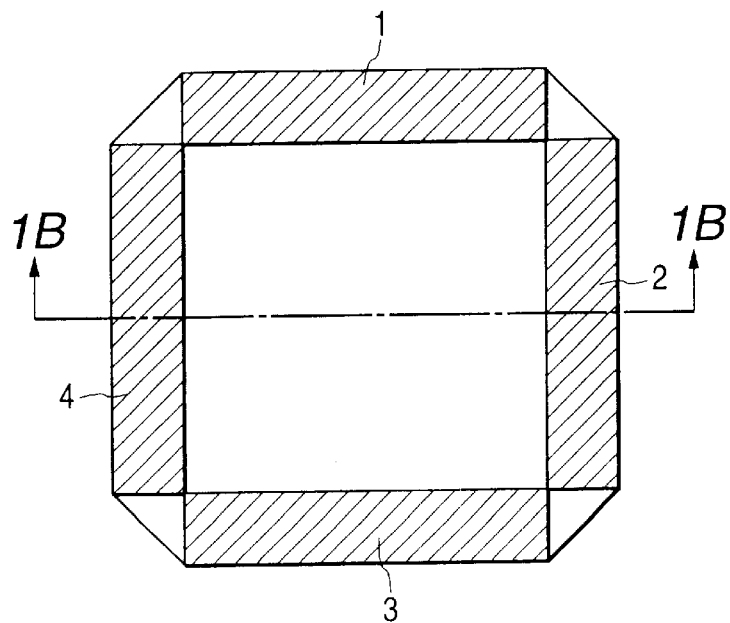
FIGS. 1A, 1B and 1C are top views and a sectional view showing the structure of a semiconductor laser gyro according to the present invention.
Figure 1B:
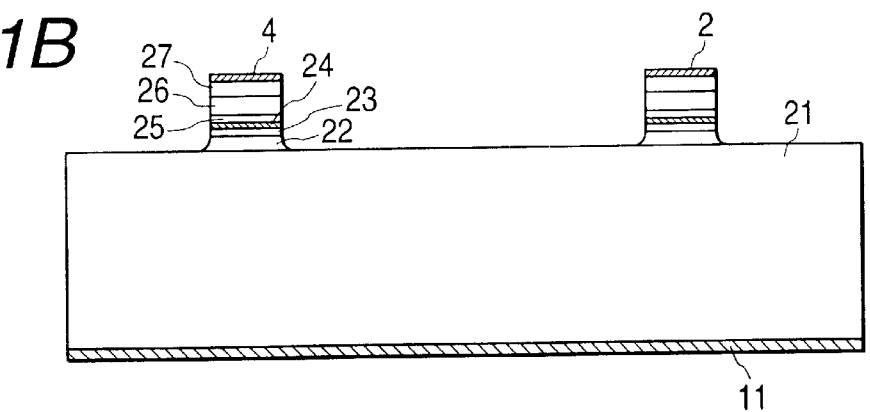
Figure 1C:
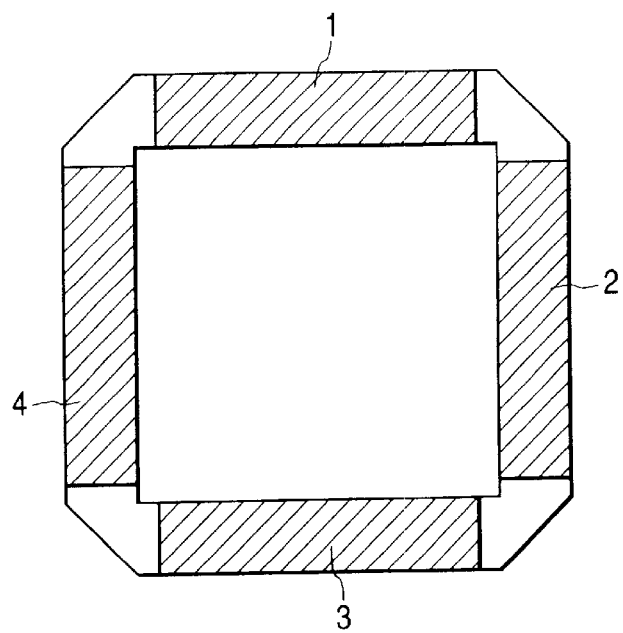

FIGS. 1A to 1C are drawings most properly showing the characteristic of the present invention, FIG. 1A is a top view of a semiconductor laser gyro of the present invention and FIG. 1B is a sectional view cut along 1B—1B line in FIG. 1A. In the same drawing, reference numerals 1, 2, 3 and 4 denote anodes, reference numeral 11 a cathode, reference numeral 21 a semiconductor substrate, reference numeral 22 a buffer layer, reference numeral 23 an optical guiding layer, reference numeral 24 an active layer, reference numeral 25 an optical guiding layer, reference numeral 26 a cladding layer and reference numeral 27 a cap layer.

Note that, in FIG. 1A, anodes look like partially touching with each other, but actually they are separated from each other as shown in FIG. 1C.

Also, FIG. 2 to FIG. 8 are sectional views explaining the manufacturing process of the semiconductor laser gyro of the present invention. Note that the same reference numerals are attached to the same components with FIGS. 1A to 1C. In each drawing, reference numeral 28 denotes an anode material and reference numeral 31 a photoresist.

Figure 2:
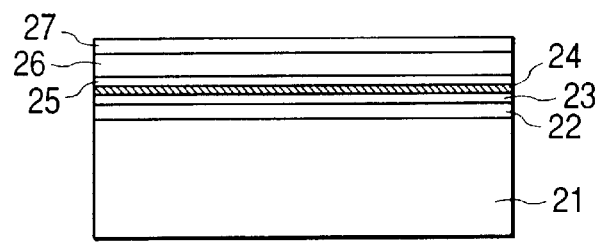
FIG. 2 is a sectional view explaining the manufacturing process of the semiconductor laser gyro according to the present invention.
Figure 3:
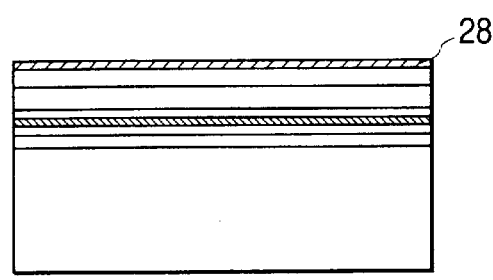
FIG. 3 is a sectional view explaining the manufacturing process of the semiconductor laser gyro according to the present invention.
Figure 4:
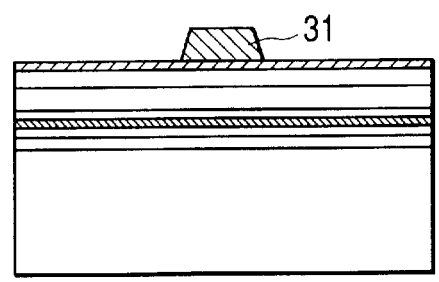
FIG. 4 is a sectional view explaining the manufacturing process of the semiconductor laser gyro according to the present invention.
Figure 5:
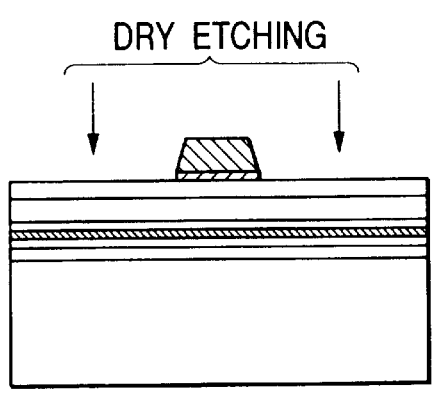
FIG. 5 is a sectional view explaining the manufacturing process of the semiconductor laser gyro according to the present invention.
Figure 6:
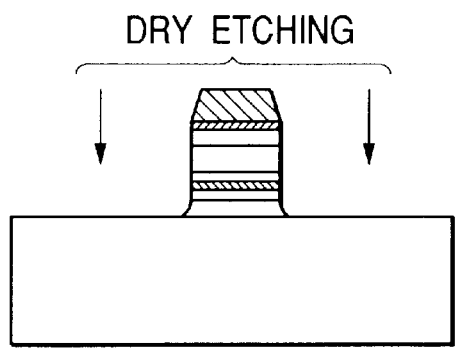
FIG. 6 is a sectional view explaining the manufacturing process of the semiconductor laser gyro according to the present invention.
Figure 7:
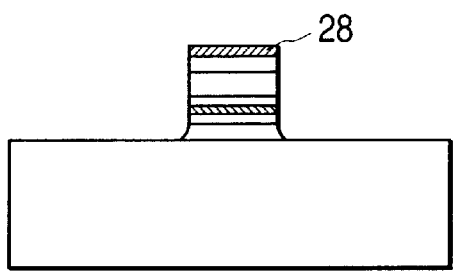
FIG. 7 is a sectional view explaining the manufacturing process of the semiconductor laser gyro according to the present invention.
Figure 8:
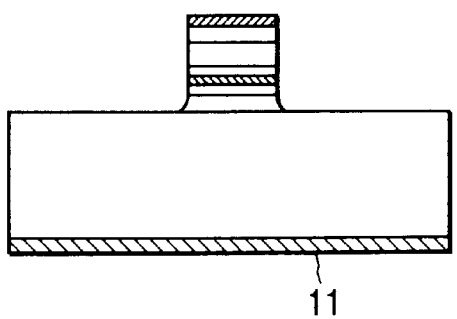
FIG. 8 is a sectional view explaining the manufacturing process of the semiconductor laser gyro according to the present invention.

First, with reference to FIG. 2 to FIG. 8, the manufacturing process of the semiconductor laser gyro of the present invention will be described. First, as shown in FIG. 2, by using metal organic vapor phase epitaxial growth techniques, an InP buffer layer 22 (a thickness of 0.05 μm), an undoped InGaAsP optical guiding layer 23 having 1.3 μm composition (a thickness of 0.15 μm), an undoped InGaAsP active layer 24 having 1.55 μm composition (a thickness of 0.1 μm), an undoped InGaAsP optical guiding layer 25 having 1.3 μm composition (a thickness of 0.15 μm), a p-InP cladding layer 26 (a thickness of 2 μm) and a p-InGaAsP cap layer 27 having 1.4 μm composition (a thickness of 0.3 μm)are grown on an n-InP substrate 21 (a thickness of 350 μm). After the grain growth thereof, as shown in FIG. 3, a Cr/Au as an anode material 28 is formed by vapor deposition on the p-InGaAsP cap layer 27. Then, by using a spin coater, an AZ-1350 (manufactured by Hoechst) is coated as a photoresist 31 on the anode material 28 in such a manner that the coating thickness thereof becomes 1 μm. After a heat treatment is conducted as a pre-baking at a temperature of 80 degrees for 30 minutes, a wafer is exposed by masking. The photoresist 31 after development and rinse has a slightly tapered shape as shown in FIG. 4. Also, the width of the stripe thereof is 5 μm and the length of one side of the electrode is 100 μm. Thereafter, the wafer is guided to a reactive ion etching system and, as shown in FIG. 5, the Cr/Au of the anode material 28 is dry-etched with the photoresist 31 as an etching mask. The gas employed for the etching is Ar for Au and $CF_4$ for Cr. Next, by using a chlorine gas, the semiconductor layer is etched so that the height of an optical waveguide becomes 3.2 μm. This aspect is shown in FIG. 6 and, as shown in FIG. 7, the photoresist 31 is removed. Subsequently, the photoresist undergoes the patterning once again and the Cr/Au of a corner portion and the cap layer are etched and the intervals of the anodes are electrically insulated. The separation resistance between the anodes is 1 KΩ. Thereafter, the anode 28 is annealed in a hydrogen atmosphere and an ohmic contact is realized. Next, as shown in FIG. 8, AuGe/Ni/Au as the cathode 11 is vapor-deposited on the n-InP substrate 21, which is finally annealed in the hydrogen atmosphere with ohmic contact realized.

Next, by using FIGS. 9A and 9B, the operation of the semiconductor laser gyro will be described. In this embodiment, as shown in FIG. 9A, the anodes are segmented into four pieces, and one piece of the anode and one piece of the cathode are used as one pair. Now, the current is flowed to the anodes 1, 2 and 3 with a timing as shown in FIG. 9B. At this time, a constant current 4 mA is injected to the electrode 4.

Since the semiconductor and the air are different in respect of the refractive index, a reflection is caused on the interface. Assuming that the refractive index n of the semiconductor is n=3.5, a total reflection is caused by not less than 16.6 degrees of the angle made by a normal line and a laser beam against the interface. Since the mode whose field is totally reflected, has low oscillating threshold in contrast to another mode by a degree where no mirror loss is found, an oscillation begins at low injected current. Moreover, because a gain is concentrated into this oscillating mode, other modes are suppressed.

In the semiconductor laser gyro of FIGS. 9A and 9B, the incident angle of the laser beam at four corners is 45 degrees and satisfies the condition of the total reflection. As a result, the oscillating threshold in a room temperature is only 2 mA. A driving current is 3 mA and, when this laser is in a stationary state and a uniform current is injected to the four electrodes, the oscillating wavelength $\lambda_o$ in a vacuum is 1.55 μm.

Next, the beat frequency in a stationary state is considered. Assuming that the length l of one side of the electrode is l=100 μm and the modulating cycle $t_p$ is $t_p$=100 ms, from the Equation (1), v is given by the following Equation (15):

$$v = \frac{1}{t_p} = 1.00 \times 10^{-3} \text{ m/s} \quad (15)$$

Also, the oscillating wavelength $\lambda_o$ in a vacuum is $\lambda_o$=1.55 μm and the refractive index $n_o$ of the semiconductor is $n_o$=3.5. From the Equation (3), the beat frequency $\Delta f_n$ in a stationary state at this time is given by the following Equation (16):

$$\Delta f_n = 3.11 \times 10^3 \text{ Hz} = 3.11 \text{ kHz} \quad (16)$$

Moreover, when the semiconductor laser gyro of FIG. 9A is given a rotation counterclockwise at the speed of 30 degrees per second with a measure of a camera shake and the vibration of an automobile, the oscillating frequency $f_2$ of the laser beam clockwise is increased by 59.1 Hz. On the other hand, the oscillating frequency $f_1$ of the laser beam counterclockwise is decreased by 59.1 Hz. As a result, as shown in the Equation (6), in contrast to the semiconductor laser gyro in a stationary state, the beat frequency is increased by 118.2 Hz. On the other hand, when the semiconductor laser gyro is given a rotation clockwise at the speed of 30 degrees per second, as shown in the Equation (7), in contrast to the semiconductor laser gyro in a stationary state, the beat frequency is decreased by 118.2 Hz. Thus, by an increase and a decrease of the beat frequency, the direction of a rotation can be detected. Moreover, since the absolute value of the amount of change in the beat frequency corresponds biuniquely to the speed of a rotation, the speed of a rotation can be also measured. That is, by the present invention, the speed of a rotation and the direction of a rotation can be detected at the same time. Note that this beat frequency is observed from a change in the terminal voltage if a constant current is injected to the semiconductor laser.

Here, the material of the InGaAsP system was used as the material of the semiconductor. However, the material system such as GaAs system, ZnSe system, InGaN system, Al—GaN system and the like may be also used. Also, concerning the optical waveguide, the shape surrounding the optical path may be not only square, but whichever shape may be used such as hexagon, triangle or circle and the like as shown in FIG. 9A. Moreover, the number of anodes and cathodes is not limited to four as shown in the present embodiment, but any number may be used if plural.

Note that what is meant by one propagating direction includes, of course, the case where the electrode 2 of FIG. 9A is segmented as shown in FIG. 10A and the electrodes lined up in a straight line are sequentially modulated. Also, while the current is modulated in this example, if the quantum well structure is employed for the optical waveguide, the refractive index can be controlled by a voltage through the utilization of a quantum confined stark effect.

[Embodiment 2]

Figure 11:
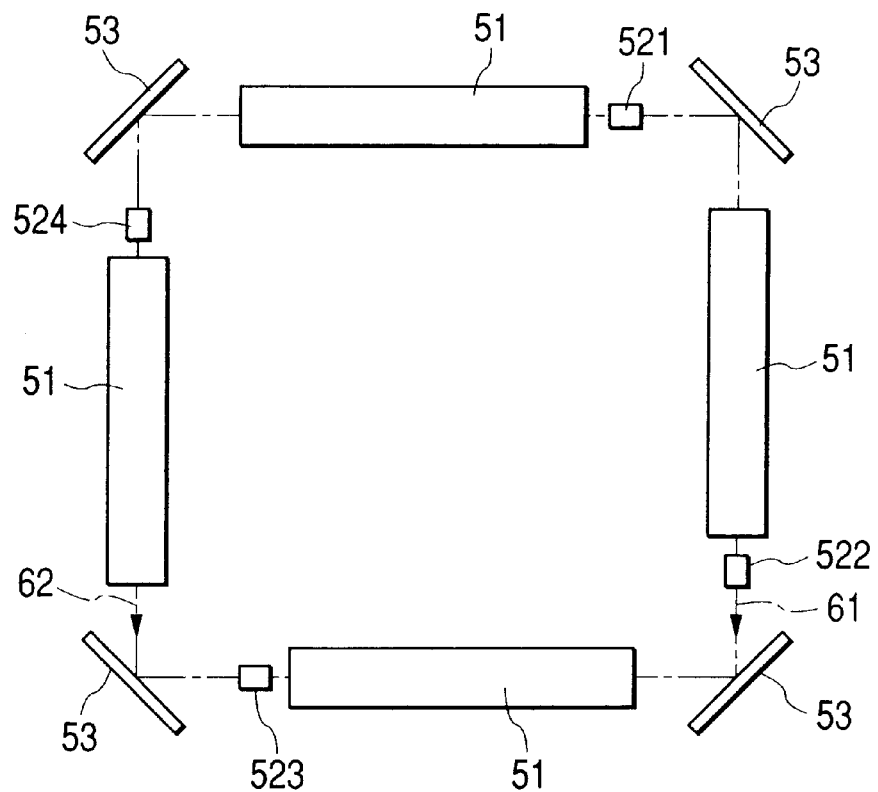
FIG. 11 is a top view showing the structure of a gas laser gyro according to the present invention.

FIG. 11 is a typical plan view showing one sample of an optical gyro provided with a resonator type gas laser in which light propagates circularly according to the present invention and the case where the propagating path of the laser beam is square. In FIG. 11, reference numeral 51 denotes a discharge tube, reference numeral 53 a mirror, reference numerals 521, 522, 523 and 524 refractive index modulating elements, reference numeral 61 a laser beam clockwise and reference numeral 62 a counterclockwise laser beam.

Figure 12:
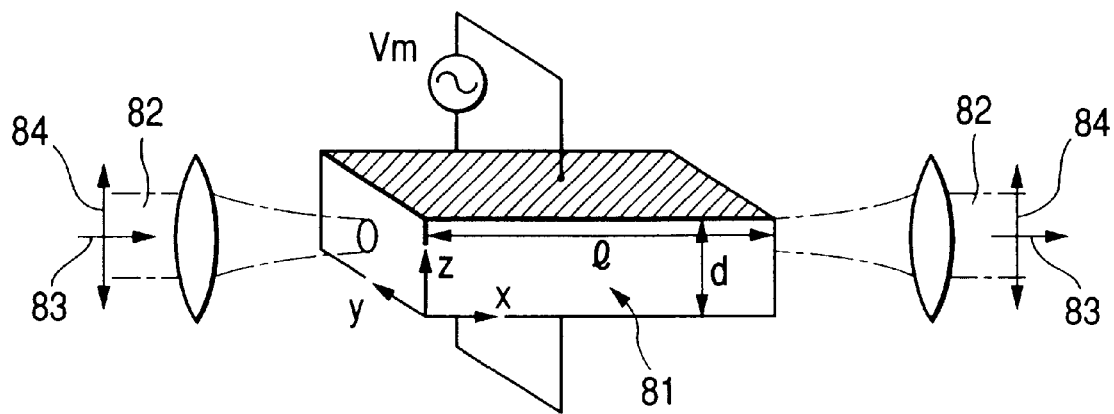
FIG. 12 is a perspective view explaining a refractive index modulation element according to the present invention.
Figure 13:
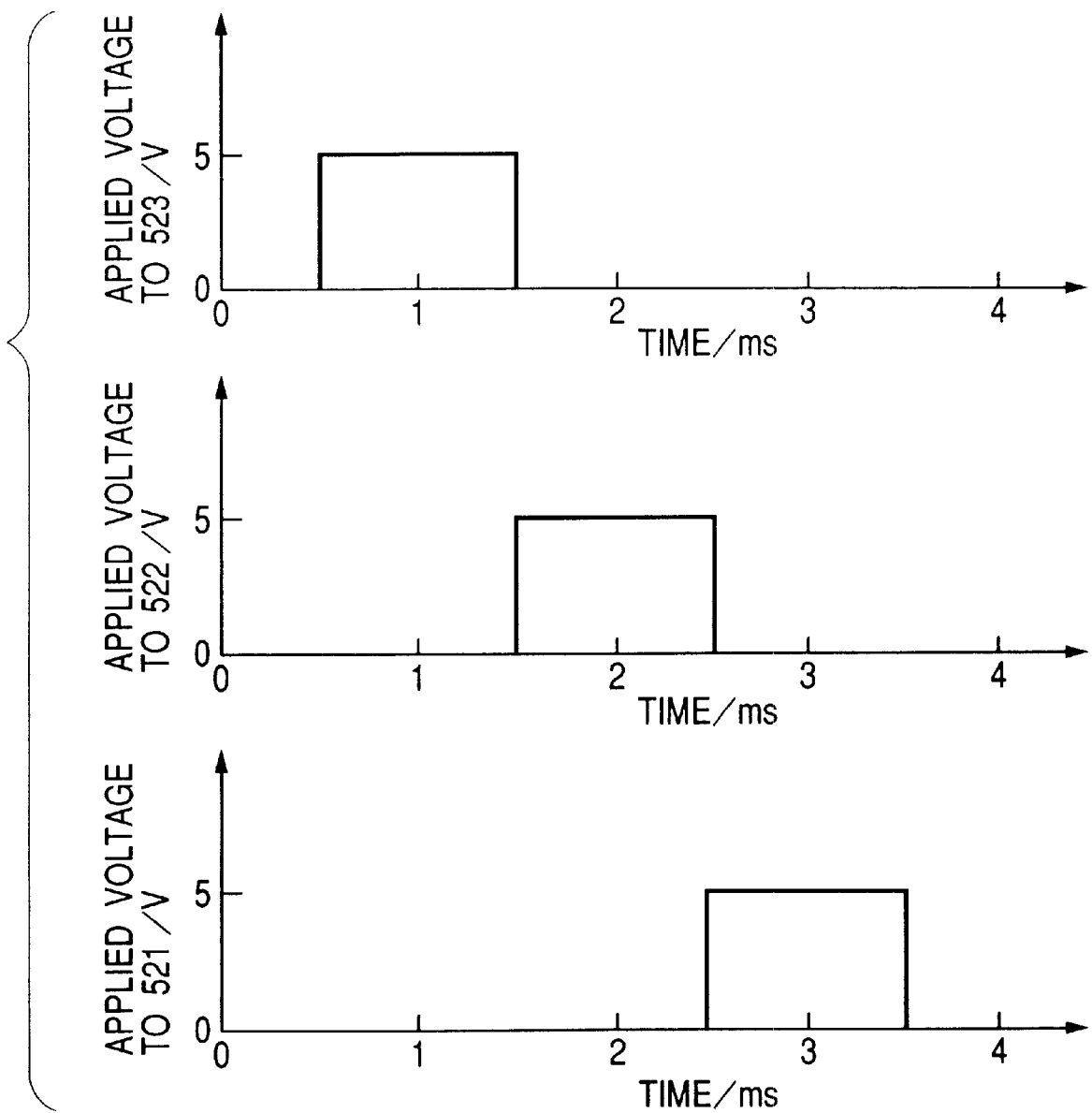
FIG. 13 is a drawing explaining a timing chart for the voltage inputted to the refractive index modulation element according to the present invention.

In the above configuration, when a helium gas and a neon gas are introduced into the discharge tube 51 and the voltage is applied across the anodes and the cathodes, the discharge begins and the state is such that the current flows. The distances between the mirrors 53 are set to be 10 cm. When this optical gyro is in a stationary state, the oscillating frequencies of the laser beams clockwise and counterclockwise are quite identical which are $4.73 \times 10^{14}$ Hz and have an oscillating wavelength λ of 632.8 nm. On the other hand, the refractive index modulating elements 521, 522, 523 and 524 are Ti diffused LiNbO$_3$ refractive index modulating elements and change the refractive index by using electro-optical effect. The typical perspective view of this element is shown in FIG. 12. In the figure, numeral 81 denotes a LiNbO$_3$ crystal. The refractive index $n_p$ for the propagating direction 83 of the laser beam 82 is 2.286. Arrows 84 lying at right angles to the propagating direction 83 show directions of polarization of the light, i.e. directions in which the electric field oscillates. The voltage is applied to the refractive index modulating elements 521, 522 and 523 with a timing as shown in FIG. 13. At this time, the voltage is all constant and 5V.

Next, the beat frequency in a stationary state is considered. Assuming that the element length l of the refractive index modulating element is l=1 mm and a modulating cycle $t_p$=1 ms, from the Equation (1), v is given by the following Equation (17):

$$v = \frac{1}{t_p} = 1.00 \text{ m/s} \quad (17)$$

Also, since an optical resonator consists mainly of the gas and the air, the refractive index no thereof may be considered as $n_o$=1. At this time, from the Equation (3), the beat frequency $\Delta f_n$ in a stationary state is given by the following Equation (18):

$$\Delta f_n = 1.00 \times 10^5 \text{ Hz} = 100 \text{ kHz} \quad (18)$$

Moreover, when the gas laser gyro of FIG. 11 is given a rotation counterclockwise at the speed of 30 degrees per second with a measure of a camera shake and the vibration of an automobile, the oscillating frequency $f_2$ of the laser beam clockwise is decreased by 41.4 kHz. On the other hand, the oscillating frequency $f_1$ of the laser beam counterclockwise is decreased by 41.4 kHz. As a result, as shown in the Equation (6), in contrast to the gas laser gyro in a stationary state, the beat frequency is increased by 82.8 kHz. On the other hand, when the gas laser gyro is rotated clockwise at the speed of 30 degrees per second, as shown in the Equation (7), in contrast to the gas laser gyro in a stationary state, the beat frequency is decreased by 82.8 kHz.

In this manner, by an increase and a decrease in the beat frequency, the direction of a rotation can be detected. Moreover, since the absolute value of the amount of change in the beat frequency corresponds biuniquely to the speed of a rotation, the speed of a rotation can be measured. That is, by the present invention, a speed of a rotation and the direction of a rotation can be detected at the same time. Note that this beat frequency is observed from a change in the terminal voltage of the discharge tube if a constant current is flowed to the discharge tube configuring the gas laser.

Note that while, in the above optical gyro, the example using the helium gas and the neon gas was shown, any gas may be used if it makes a laser oscillation. Moreover, the shape of the resonator is not limited to square, but whichever shape may be used such as hexagon, triangle and the like.

The refractive index modulating element utilizing not only electro-optic effect but also accousto-optic effect and heat effect may be used.

Figure 24:
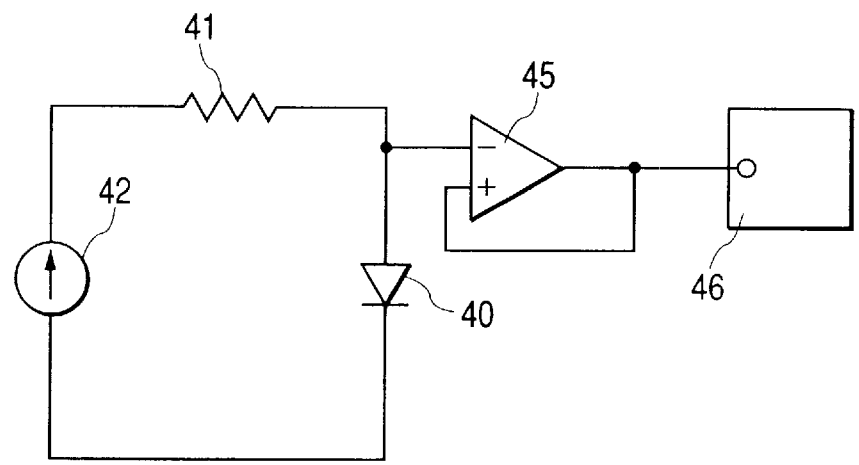
FIG. 24 is a drawing showing a method for detecting a rotation from a change in the voltage (a frequency change in the voltage) of the semiconductor laser gyro.

Hereinafter, a method for detecting a rotation from a change in the voltage (a change in the frequency of the voltage) of the laser gyro such as the semiconductor laser gyro, the gas laser gyro and the like will be described. While an example of the semiconductor laser gyro is adapted here, the same method can be used also for the gas laser gyro. In FIG. 24, the method for detecting a direction from a change in the voltage (a change in the frequency of the voltage) of the semiconductor laser gyro 40 is shown. In FIG. 24, reference numeral 40 denotes the semiconductor laser gyro, reference numeral 41 an electrical resistance, reference numeral 42 a constant current source and reference numeral 46 a voltage detection circuit. By disposing a protective circuit on the detection terminal of the semiconductor laser gyro, the deterioration or the breakdown of the semiconductor laser gyro can be prevented. For example, a voltage follower 45 is connected as the protective circuit as shown in FIG. 24.

The circuit configuration for detecting a beat signal will be described in detail.

Figure 25:
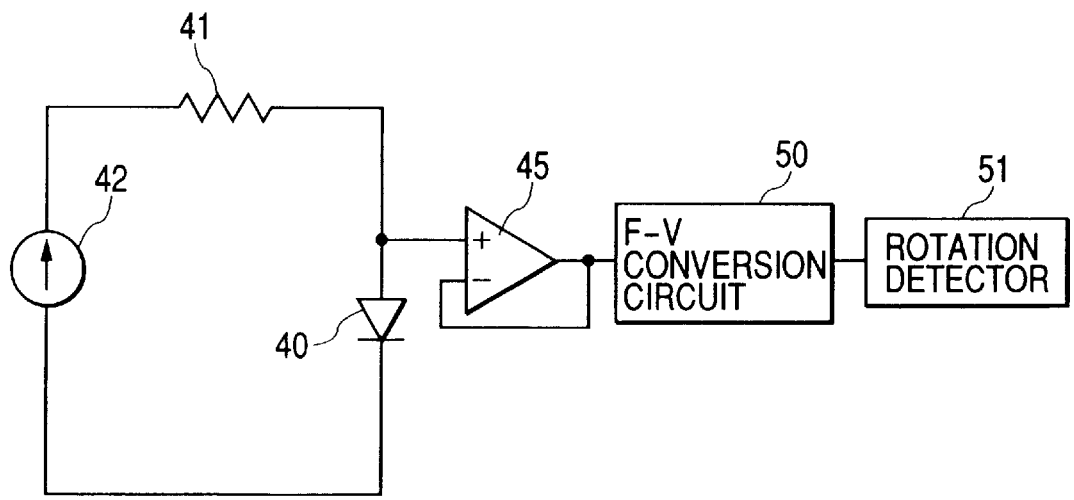
FIG. 25 is a drawing explaining in detail a circuit configuration for detecting a beat signal.

As shown in FIG. 25, the anode of the semiconductor laser gyro 40 is connected to an operational amplifier 45 for buffer. Since the signal outputted from the operational amplifier 45 has a frequency corresponding to the angular speed, it is converted into the voltage by a known frequency-voltage conversion circuit 50 (a F-V conversion circuit) so as to detect the rotation through a rotation detector 51. Of course, if the desired characteristics are obtained, the operational amplifier 45 (a voltage follower) may be omitted.

Figure 26:
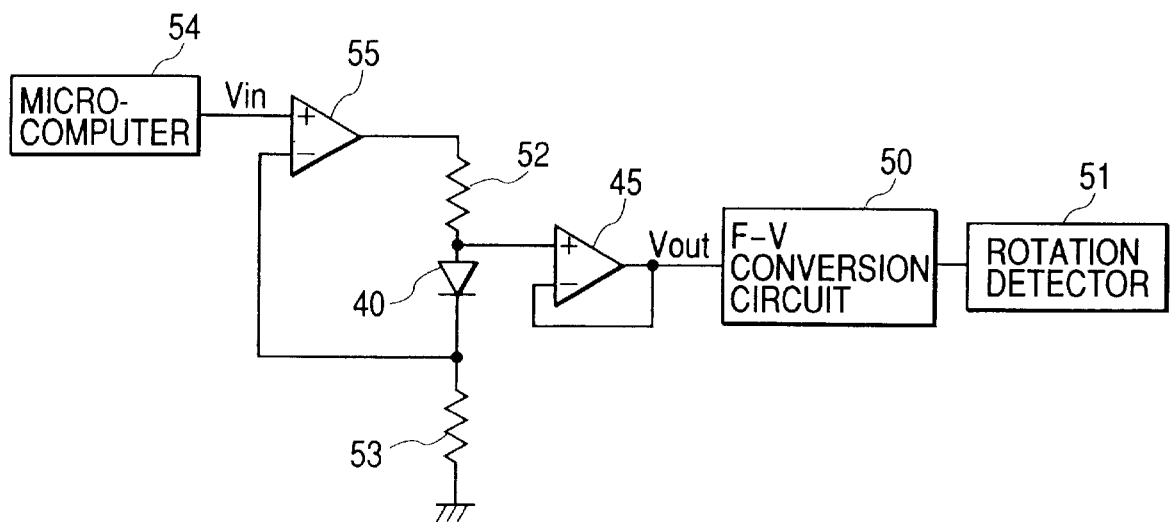
FIG. 26 is a drawing showing another configuration example of the circuit wherein the semiconductor laser gyro is driven by a constant current and a change in the anode potential of the semiconductor laser gyro 40 is read out for detecting a rotation.

In FIG. 26, another configuration example of the circuit wherein the semiconductor laser gyro is driven by a constant current and a change in the anode potential of the semiconductor laser gyro 40 is read out so as to detect the rotation. The same reference numerals are attached to the same components with FIG. 24.

The anode of the semiconductor laser gyro 40 is connected to the output terminal of the operational amplifier 55 via a protective resistor 52 and the cathode of the semiconductor laser gyro 40 is connected to the inversion input terminal of the operational amplifier 55. Also, a resistor 53 is connected between the inversion input terminal and the reference potential of the operational amplifier 55.

Here, when a controlled potential (V in) is given to the non-inversion input terminal of the operational amplifier 55 from a microcomputer 54 and the like, the current derived from the above potential and a resistor 53 becomes the constant current flowed to the semiconductor laser gyro 40 for driving. The anode of the semiconductor laser gyro 40 is connected to the operational amplifier 45. The operational amplifier 45 outputs a signal Vout. Since this signal has the beat frequency proportional to the angular speed, it is converted into a voltage by the publicly known frequency-voltage conversion circuit 50 (a F-V conversion circuit) and the like so that a rotation is detected by a rotation detector 51.

Figure 27:
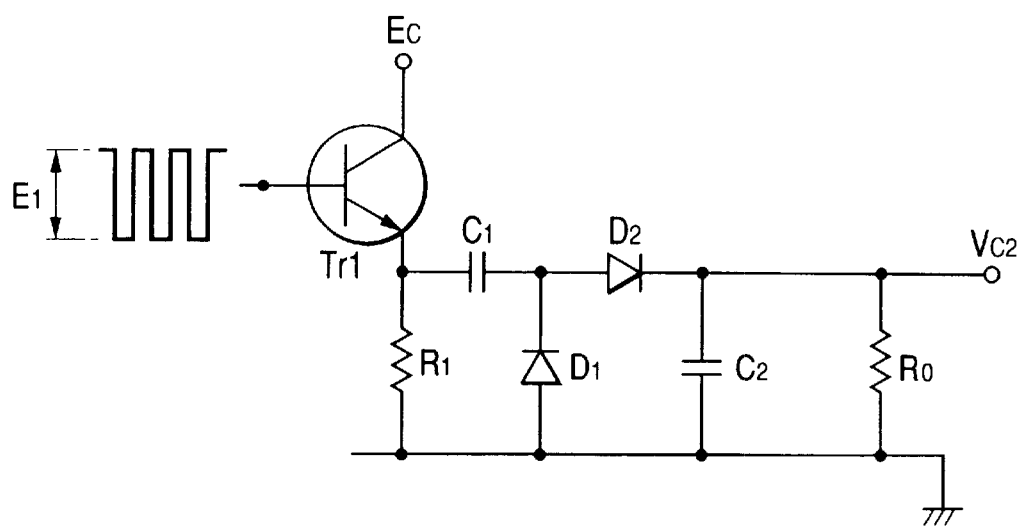
FIG. 27 is a drawing showing an example of a frequency-voltage conversion circuit (a F-V conversion circuit)

Note that, in FIG. 27, the example of the frequency-voltage conversion circuit (a F-V conversion circuit) is shown. This circuit is configured by transistor $Tr_1$, diodes $D_1$ and $D_2$, condensers $C_1$ and $C_2$ and resistances $R_0$ and $R_1$. $E_C$ denotes a bias voltage. An output voltage $V_{c2}$ is given by the following Equation (19):

$$V_{C2} = \frac{E_1 C_1 R_0 f}{1 + \frac{1}{1 - \exp(-1/(R_0 C_2 f))}} \qquad (19)$$

Here, $E_1$ denotes a peak to peak value of an input voltage and f denotes a beat frequency. By designing a circuit parameter such that it becomes $C_2 \gg C_1$, $R_0 C_{2f} \ll 1$, the following Equation (20) is given:

$$V_{c2} \approx E_1 C_1 R_0 f/2 \qquad (20)$$

so that the voltage output proportional to the beat frequency can be obtained.

Figure 28:
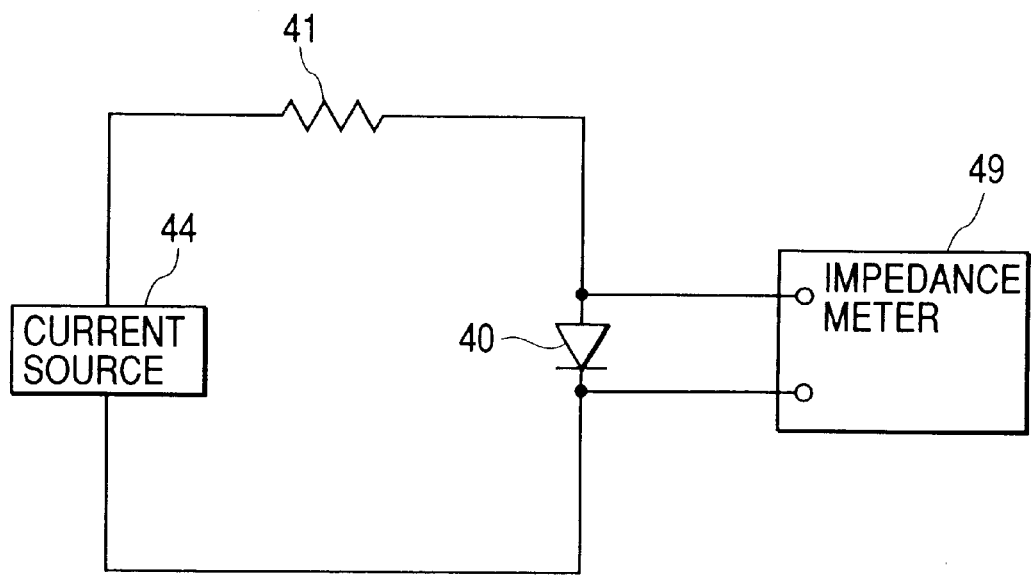
FIG. 28 is a drawing showing the case where a change in the impedance of the semiconductor laser gyro is measured by an impedance meter.
Figure 29:
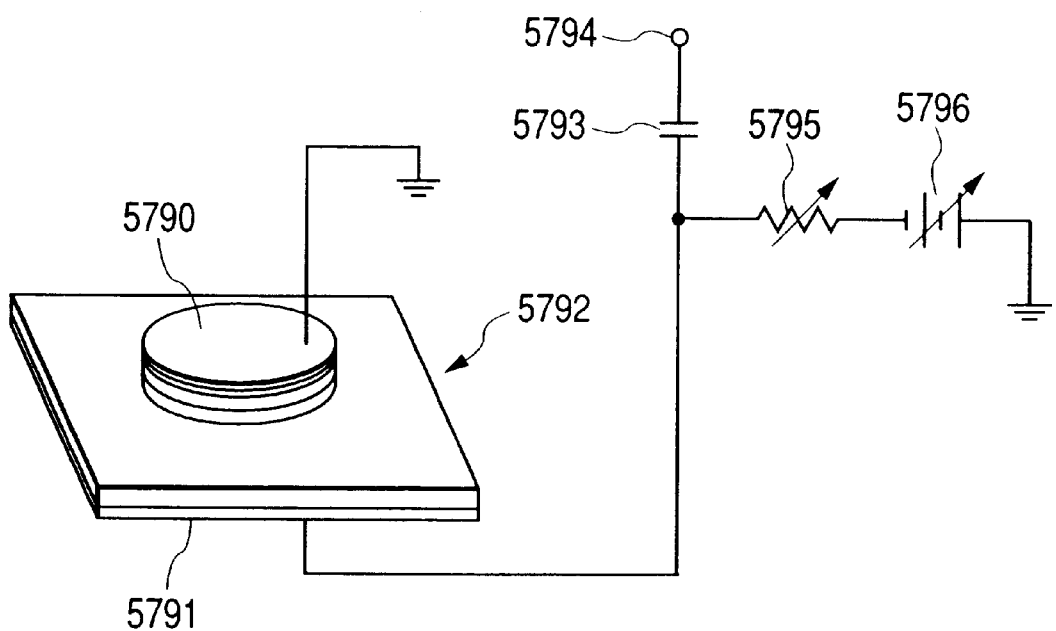
FIG. 29 is a drawing for explaining the conventional example.

Also, regardless of the kind of the current source, a change in the impedance of the semiconductor laser can be also directly measured by an impedance meter 49. Reference numeral 44 denotes the current source. In this case, different from the case where the terminal voltage is measured, the effect of a noise of the driving current source becomes small. This example is shown in FIG. 28. Numeral 40 denotes a semiconductor laser gyro, and numeral 41 denotes a resistance.

[Embodiment 3]

Figure 14B:
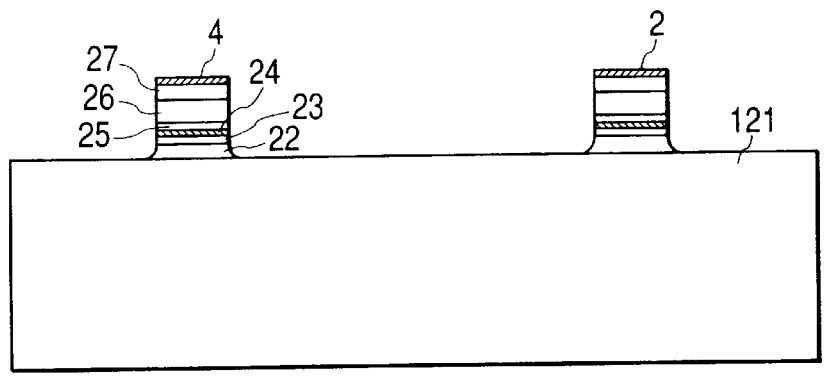

FIGS. 14A to 14D are drawings most properly showing the characteristics of the present invention. FIG. 14A is a top view of the semiconductor laser gyro of the present invention. FIG. 14B is a sectional view cut along 14B—14B line of FIG. 14A.

Figure 14C:
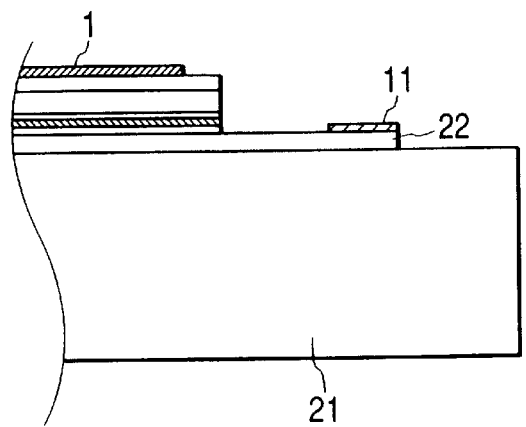
Figure 14D:
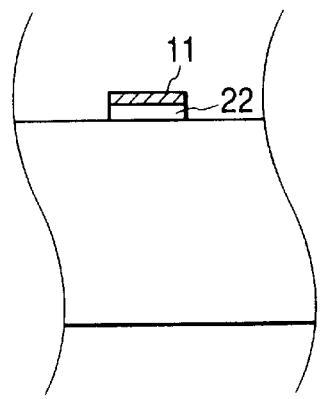

In the same drawing, reference numerals 1, 2, 3 and 4 denote anodes, reference numerals 11, 12, 13 and 14 cathodes, reference numeral 121 a semiconductor substrate, reference numeral 22 a buffer layer, reference numeral 23 an optical guiding layer, reference numeral 24 an active layer, reference numeral 25 an optical guiding layer, reference numeral 26 a cladding layer and reference numeral 27 a cap layer. Also, FIG. 15 to FIG. 23 are sectional views explaining the manufacturing process of the semiconductor laser gyro of the present invention. In the same drawings, reference numeral 28 denotes an anode material, reference numeral 29 a cathode material and reference numerals 31, 32 photoresists. Note that FIG. 14C is a sectional view cut along 14C—14C line in FIG. 14A and FIG. 14D is a sectional view cut along 14D–14D line in FIG. 14A.

Figure 15:
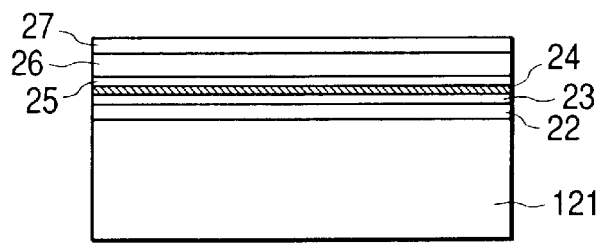
FIG. 15 is a sectional view explaining the manufacturing process of the semiconductor laser gyro according to the present invention.
Figure 16:
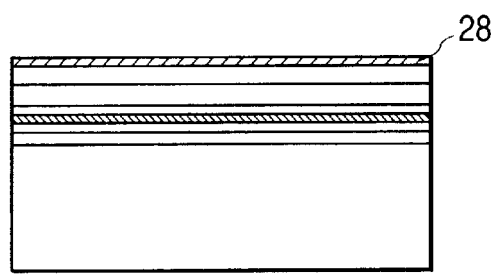
FIG. 16 is a sectional view explaining the manufacturing process of the semiconductor laser gyro according to the present invention.

Hereinafter, with reference to FIG. 15 to FIG. 23, the manufacturing process of the semiconductor laser gyro of the present invention will be described. First, as shown in FIG. 15, by using metal organic vapor phase epitaxial growth techniques, an InP buffer layer 22 (a thickness of 0.05 μm), an undoped InGaAsP optical guiding layer 23 having 1.3 μm composition (a thickness of 0.15 μm), an undoped InGaAsP active layer 24 having 1.55 μm composition (a thickness of 0.1 μm), an undoped InGaAsP optical guiding layer 25 having 1.3 μm composition (a thickness of 0.15 μm), a p-InP cladding layer 26 (a thickness of 2 μm) and a p-InGaAsP cap layer 27 having 1.4 μm composition (a thickness of 0.3 μm) are grown on a semi-insulating-InP substrate 121 (a thickness of 350 μm). After the grain growth thereof, as shown in FIG. 16, a Cr/Au as an anode material 28 is formed by vapor deposition on the p-InGaAsP cap layer 27. Then, by using a spin coater, an AZ-1350

Figure 17:
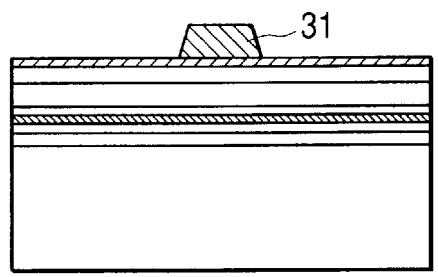
FIG. 17 is a sectional view explaining the manufacturing process of the semiconductor laser gyro according to the present invention.
Figure 18:
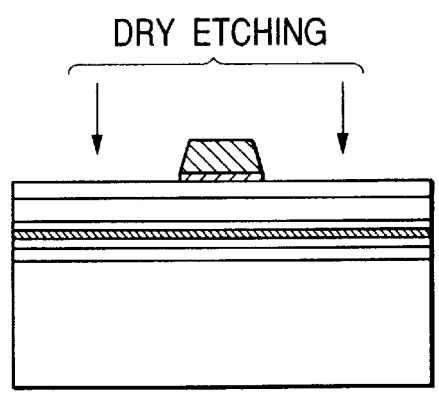
FIG. 18 is a sectional view explaining the manufacturing process of the semiconductor laser gyro according to the present invention.
Figure 19:
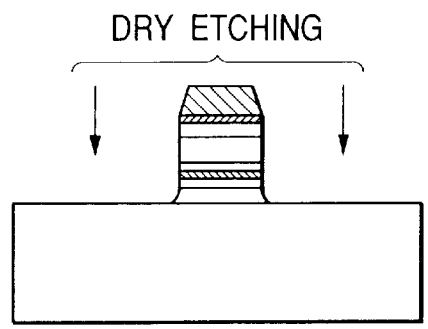
FIG. 19 is a sectional view explaining the manufacturing process of the semiconductor laser gyro according to the present invention.
Figure 20:
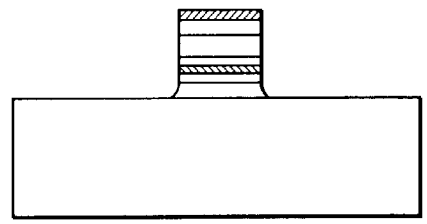
FIG. 20 is a sectional view explaining the manufacturing process of the semiconductor laser gyro according to the present invention.
Figure 21:
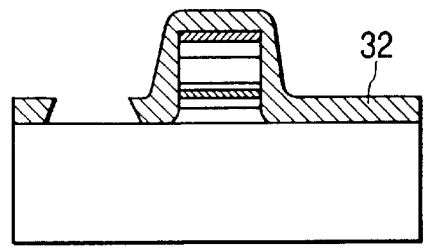
FIG. 21 is a sectional view explaining the manufacturing process of the semiconductor laser gyro according to the present invention.
Figure 22:
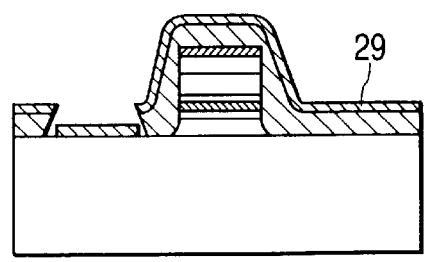
FIG. 22 is a sectional view explaining the manufacturing process of the semiconductor laser gyro according to the present invention.
Figure 23:
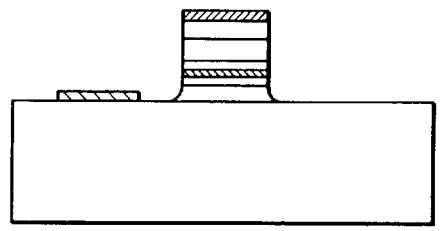
FIG. 23 is a sectional view explaining the manufacturing process of the semiconductor laser gyro according to the present invention.

(manufactured by Hoechst) is coated as a photoresist 31 on the anode material 28 in such a manner that the coating thickness thereof becomes 1 μm. After a heat treatment is conducted as a pre-baking at a temperature of 80 degrees for 30 minutes, a wafer is exposed by masking. The photoresist 31 after development and rinse has a slightly tapered shape as shown in FIG. 17. Also, the width of the stripe thereof is 5 μm and the length of one cycle of the optical waveguide is 600 μm. Thereafter, the wafer is guided to a reactive ion etching system and, as shown in FIG. 18, the Cr/Au of the anode material 28 is dry-etched with the photoresist 31 as an etching mask. The gas employed for the etching is Ar for Au and $CF_4$ for Cr. Next, by using a chlorine gas, the semiconductor layer is etched so that the height of an optical waveguide becomes 3.2 μm. This aspect is shown in FIG. 19 and, as shown in FIG. 20, the photoresist 31 is removed. Subsequently, the photoresist undergoes the patterning and the Cr/Au of a corner portion and the cap layer are etched and the intervals of the anodes are electrically insulated. The separation resistance between the anodes is 1 kΩ. Thereafter, the anode 28 is annealed in a hydrogen atmosphere and an ohmic contact is realized. Next, in order to form the cathode by a lift off, by using a spin coater, a photoresist 32 is coated so as to cover the whole surface of the wafer. The photoresist 32 is RD-2000N (manufactured by Hitachi Kasei) and has a thickness of 1 μm. After a pre-baking is conducted at a temperature of 90 degrees for 30 minutes, the wafer is exposed by masking. The photoresist 32 after development and rinse has a reversed tapered shape suitable for the lift off as shown in FIG. 21. Subsequently, as shown in FIG. 22, AuGe/Ni/Au is deposited as a cathode material 29 on the n-InP substrate 121. Thereafter, by rinsing this wafer in an organic solvent by ultrasonic wave, a cathode 29 is selectively formed as shown in FIG. 23. In order that the current is flowed only across each pair of the anode/the cathode, the intervals of the cathodes are also insulated by using ion injection and the like. Also, the intervals of the cathodes may be separated through patterning. Finally, the cathodes are annealed in the hydrogen atmosphere with ohmic contact realized.

Next, by using FIGS. 14A to 14D, the operation of the semiconductor laser gyro will be described. In this embodiment, the anodes and the cathodes are segmented into four pieces, and one piece each of the anode and one piece each of the cathode are used as one pair. By combining the anode 1 with the cathode 11, the anode 2 with the cathode 12, the anode 3 with the cathode 13 and the anode 4 with the cathode 14 respectively, the current is injected to the intervals of each pair. Since the anode electrode and the cathode electrode are independent respectively, the current, for example, does not flow across the anode 2 and the cathode 11. In FIG. 14A, the anodes 1, 2 are depicted as if they touch with each other, but actually they are separated as shown in FIG. 1C. At this time, in FIG. 14A, the electron moves counterclockwise.

Since the semiconductor and the air are different in respect of the refractive index, a reflection is caused on the interface. Assuming that the refractive index n of the semiconductor is n=3.5, a total reflection is caused by not less than 16.6 degrees of the angle made by a normal line and a laser beam against the interface. Since the mode whose field is totally reflected, has low oscillating threshold in contrast to another mode by a degree where no mirror loss is found, an oscillation begins at low injected current. Moreover, because a gain is concentrated into this oscillating mode, other oscillation modes are suppressed. In the semiconductor laser gyro of FIGS. 14A to 14D, the incident angle of the laser beam at four corners is 45 degrees and satisfies the condition of the total reflection. As a result, the oscillating threshold at a room temperature is only 3 mA. A driving current is 4.5 mA and, when this laser is in a stationary state, the oscillating wavelength $\lambda_o$ in a vacuum is 1.55 μm.

Next, the beat frequency in a stationary state is considered. Since a diffusion length $L_n$ of the electron is $L_n$=2 μm and a recombination life $\tau_n$=1×10$^{-8}$ s, the speed of the electron v is given by the following Equation (21):

$$v = \frac{L_n}{\tau_n} = 2 \times 10^2 \text{ m/s} \qquad (21)$$

Also, the oscillating wavelength in a vacuum $\lambda_o$=1.55 μm and the refractive index n of the semiconductor is n=3.5. At this time, the beat frequency Δf in a stationary state is given by the following Equation (22):

$$\Delta f = 9.0 \times 10^8 \text{ Hz} = -900 \text{ MHz} \qquad (22)$$

Moreover, when the semiconductor laser gyro of FIG. 1A to FIG. 1C is rotated counterclockwise at the speed of 30 degrees per second with a measure of a camera shake and the vibration of an automobile, the oscillating frequency $f_2$ of the laser beam clockwise is increased by 88.7 Hz. On the other hand, the oscillating frequency $f_1$, of the laser beam counterclockwise is decreased by 88.7 Hz. As a result, as shown in the Equation (13), in contrast to the semiconductor in a stationary state, the beat frequency is increased by 177.4 Hz. On the other hand, when the semiconductor laser gyro is given a rotation clockwise at the speed of 30 degrees per second, as shown in the Equation (14), in contrast to the semiconductor in a stationary state, the beat frequency is decreased by 177.4 Hz. Thus, by increase and decrease in the beat frequency, the direction of a rotation can be detected. Moreover, since the absolute value of the amount of change in the beat frequency corresponds to the speed of a rotation, the speed of a rotation can be also measured. That is, by the present invention, the speed of a rotation and the direction of a rotation can be detected at the same time. Note that this beat frequency is observed from a change in the terminal voltage if a constant current is flowed to the semiconductor laser. Note that FIG. 14A shows the case where a pair of the anode and the cathode is used in four pairs. However, it is preferable that the current area where the current flows in the same direction with the laser beam is available in a part of the electrode area.

Here, the material of the InGaAsP system was used as the material of the semiconductor. However, the material system such as GaAs system, ZnSe system, InGaN system, Al—GaN system and the like may be also used. Also, concerning the optical waveguide, the shape surrounding the optical path may be not only square as shown in FIGS. 1A to 1C, but whichever shape may be used such as hexagon, triangle or circle and the like. Moreover, the number of anodes and cathodes is not limited to four as shown in the present embodiment, but any number may be used if plural.

Note that, concerning the method for detecting a rotation from a change in the voltage (a change in the frequency of the voltage) of the semiconductor laser gyro, the method described as above can be used.

As described above, according to the present invention, the direction of a rotation can be detected even if a dither is not driven.

What is claimed is:
1. A ring laser gyro comprising:
 a ring laser having at least a first laser beam and a second laser beam propagating in opposite directions from each other, said ring laser comprising electrode areas and an optical waveguide; and a control for controlling current injected or voltage applied to the electrode areas so that the oscillating frequencies of the first and second laser beams become different from each other at a time when the ring laser gyro is in a stationary state, wherein current is injected to the electrode areas, and wherein the injected current is controlled by the control such that a space, in which a refractive index of the optical waveguide is modulated, moves in the same direction as the propagating direction of the first or second laser beam as time goes on.

2. A ring laser gyro comprising:

a ring laser having at least a first laser beam and a second laser beam propagating in opposite directions from each other, said ring laser comprising electrode areas and an optical waveguide; and a control for controlling current injected or voltage applied to the electrode areas so that the oscillating frequencies of the first and second laser beams become different from each other at a time when the ring laser gyro is in a stationary state, wherein current is injected to the electrode areas, and wherein the injected current is controlled by the control such that the injected current is propagated in the same direction as the propagating direction of the first or second laser beam.

3. The ring laser gyro according to claim 2, wherein the electrode areas are anodes and one cathode is disposed for each of the anodes.

4. A method for driving a ring laser gyro having electrodes comprising the step of driving such that a space, in which the refractive index of an optical waveguide is modulated, moves in one propagating direction as time goes on.

5. A method for driving a ring laser gyro having electrodes comprising the step of modulating voltage applied or current injected to the electrodes, wherein a time difference is set among the electrodes so that a sequence of modulations is in a propagating direction.

6. A method for driving a semiconductor laser gyro comprising the step of flowing current in one direction to generate a laser oscillation light, wherein the light is propagated in a direction with the current or is propagated in a direction opposite to the current.

7. A ring laser gyro comprising:

a ring laser having at least a first laser beam and a second laser beam propagating in opposite directions from each other, said ring laser comprising electrode areas and an optical waveguide; and a control for controlling current injected or voltage applied to the electrode areas so that the oscillating frequencies of the first and second laser beams become different from each other at a time when the ring laser gyro is in a stationary state, wherein voltage is applied to the electrode areas, and wherein the applied voltage is controlled by the control such that a space, in which a refractive index of the optical waveguide is modulated, moves in the same direction as the propagating direction of the first or second laser beam as time goes on.

8. A ring laser gyro comprising:

a ring laser having at least a first laser beam and a second laser beam propagating in opposite directions from each other, said ring laser comprising electrode areas and an optical waveguide; and a control for controlling current injected or voltage applied to the electrode areas so that the oscillating frequencies of the first and second laser beams become different from each other at a time when the ring laser gyro is in a stationary state, wherein voltage is applied to the electrode areas, and wherein the applied voltage is controlled by the control such that the applied voltage is propagated in the same direction as the propagating direction of the first or second laser beam.

* * * * *

UNITED STATES PATENT AND TRADEMARK OFFICE
CERTIFICATE OF CORRECTION

PATENT NO. : 6,631,002 B1
DATED : October 7, 2003
INVENTOR(S) : Takahiro Numai

It is certified that error appears in the above-identified patent and that said Letters Patent is hereby corrected as shown below:

Title page,
Item [57], ABSTRACT,
Line 17, "lager" should read -- laser --.

Column 4,
Line 54, "$V_L$" should read -- $v_L$ --;

Column 6,
Line 25, "area." should read -- the area. --.

Column 7,
Line 7, "fluctuate" should read -- fluctuates --.

Column 8,
Line 66, "has" should read -- has a --.

Column 9,
Line 1, "at" should read -- at a --.

Column 10,
Line 44, "no" should read -- no. --.

Column 14,
Line 18, "$\Delta f = 9.0 \times 10^8$ Hz = $-900$ MHz" should read -- $\Delta f = 9.0 \times 10^8$ Hz = 900 MHz --
Line 25, "$f_1$," should read -- $f_1$ --.

Signed and Sealed this

Twenty-eighth Day of September, 2004

JON W. DUDAS
*Director of the United States Patent and Trademark Office*